No. 685,355. Patented Oct. 29, 1901.
A. SMITH.
CLOVER BUNCHER.
(Application filed Dec. 17, 1900.)
(No Model.)
2 Sheets—Sheet 1.
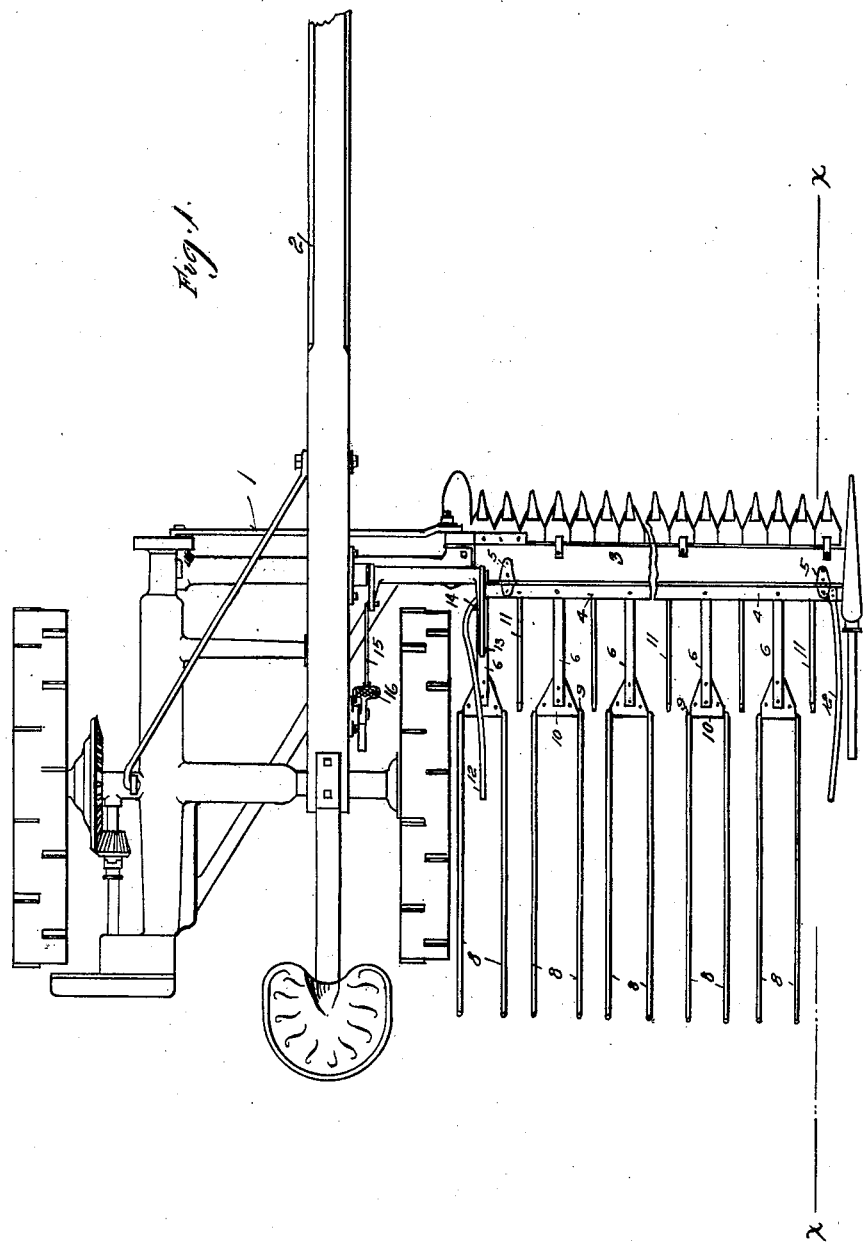

No. 685,355. Patented Oct. 29, 1901.
A. SMITH.
CLOVER BUNCHER.
(Application filed Dec. 17, 1900.)
(No Model.) 2 Sheets—Sheet 2.
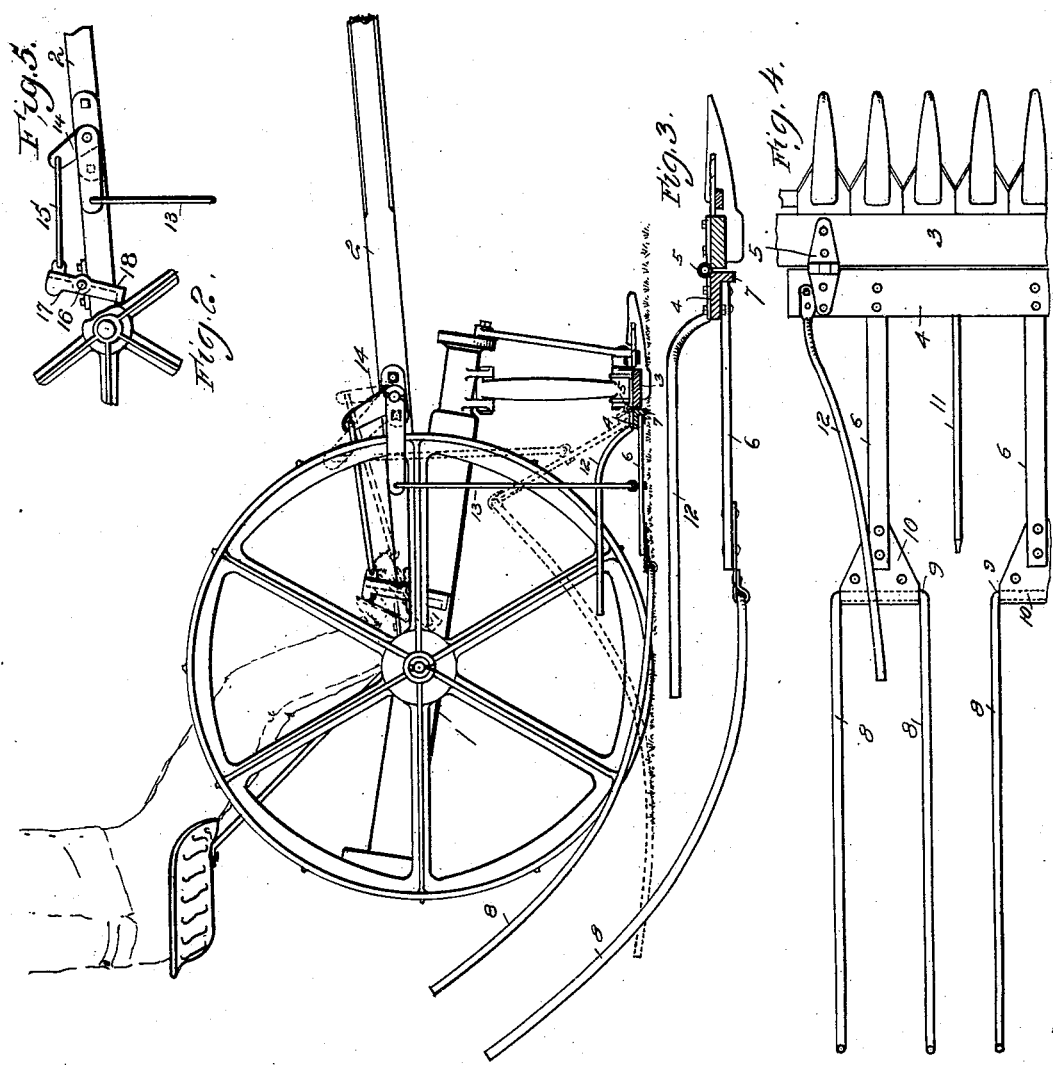
WITNESSES: INVENTOR,

UNITED STATES PATENT OFFICE.

AMOS SMITH, OF VIENNA CROSSROADS, OHIO.

CLOVER-BUNCHER.

SPECIFICATION forming part of Letters Patent No. 685,355, dated October 29, 1901.

Application filed December 17, 1900. Serial No. 40,125. (No model.)

*To all whom it may concern:*

Be it known that I, AMOS SMITH, a citizen of the United States, residing at Vienna Crossroads, in the county of Clark and State of Ohio, have invented certain new and useful Improvements in Clover-Bunchers, of which the following is a specification, reference being had therein to the accompanying drawings.

This invention relates to clover-bunchers, or, in other words, to mechanism whereby clover and similar growths may be cut and deposited in compact bunches upon the field at suitable intervals.

The object of the present invention is to provide a structure adapted to be readily attached to a mower or reaper and by means of which the clover may be effectively bunched and deposited in the best condition for drying.

To this end the invention consists in certain novel features, which I will now proceed to describe and will then particularly point out in the claims.

In the accompanying drawings, Figure 1 is a plan view of a mowing-machine having my improvement attached thereto. Fig. 2 is a vertical sectional view taken on the line x x of Fig. 1. Fig. 3 is an enlarged detail sectional view taken on the same line as Fig. 2, but omitting portions of the mechanism. Fig. 4 is an enlarged detail plan view, and Fig. 5 is a detail view, of a portion of the construction.

In the said drawings I have shown my improved buncher as employed in connection with a well-known type of mowing-machine, and it will be understood that the attachment is adapted for use with any type of mower or reaper. In the drawings the mower chosen for purposes of illustration is indicated by the reference-numeral 1, its beam or tongue by 2, and the hinged or pivoted finger-bar by 3. This bar floats in the usual manner over the surface of the ground, to the configuration of which its movements conform.

4 indicates a bar connected to the rear edge of the finger-bar by means of hinges 5, bolted or otherwise secured to the finger-bar. The bar 4 lies normally in the same plane as the finger-bar and has attached to it and extending rearwardly therefrom a plurality of fingers 6, preferably consisting of flat steel bars or straps secured to the under side of the bar 4, which latter is preferably provided at its forward edge with a downwardly-projecting flange 7, against which the front ends of the fingers 6 abut.

Pivotally connected with the fingers 6 is a corresponding series of fingers or tines 8, this connection being preferably effected in the manner shown, in which the fingers or tines 8 are grouped in pairs, constructed by bending the rods of which they are made into U shape, the cross-piece 9 of the two parts being embraced by a sheet-steel clip 10, secured to the under side of the rear end of the corresponding finger 6. The fingers or tines 8 extend rearward from the fingers 6, their forward portions normally resting upon the ground and their rear portions extending upward from the ground, preferably in the curved form shown. In the spaces between the fingers 6 are located auxiliary fingers 11, extending rearward from the bar 4 to a point somewhat in advance of the front ends of the fingers or tines 8. The attachment is provided with guide-fingers 12, attached to each end of the bar 4 and extending thence rearward, upward, and inward toward each other to guide the clover properly into the receiving-fingers and diminish the length of the bundle sufficiently to permit the wheels and horses to pass on each side of the same at the next passage of the machine. The attachment thus constructed may be provided with any suitable operating mechanism. That shown consists of a rod 13, having its lower end connected with the innermost of the fingers 4, its upper end being connected with one arm of a bell-crank lever 14, mounted on the tongue 2. The other arm of the bell-crank lever 14 is connected, by means of a link 15, with a foot-lever 16, mounted on the tongue in convenient proximity to the driver's seat. This foot-lever has a toe-plate 17 at its upper end and a heel-plate 18 at its lower end, pressure on the latter serving to hold the buncher in a gathering position or to return it thereto, while pressure on the former serves to move the buncher into a dumping position. The apparatus thus constructed operates in the following manner: The parts being in the position shown in full lines in Fig. 2, the clover is cut as the machine advances and falls upon the fingers of the buncher, being carried rearward along the same by reason of the stubble, which projects upward between said fingers. This rearward movement is facilitated by the fact that the forward ends of the curved fingers or tines actually rest upon and are dragged along over the soil. The upwardly-curved rear ends of these fingers serve to arrest the rearward movement of the clover, which rests upon or against said rear ends, accumulating there until a bunch of the desired size is gathered. During this period the buncher may be held in the gathering position, if necessary, by pressure against the lower end of the foot-lever 16 or in any other suitable manner. When it is desired to dump the bunch, pressure on the upper end of the foot-lever will tilt the bar 4 and the fingers 6 upward into the position shown in dotted lines in Fig. 2, in which position these parts serve as a cut-off to prevent the clover cut during the dumping action from being discharged from the machine, thus assuring the delivery of all the clover in proper bunches. This upward motion of the fingers 6 lifts the front ends of the fingers 8 and correspondingly depresses their rear ends, so that the clover thereon is discharged by the combined action of gravity and of the contact of the clover with the stubble and soil between the fingers 8. In this way the clover is deposited in uniform bunches, with the heads up and away from contact with the ground, in which condition and position it will most quickly dry.

After the bunch has been dumped the parts are returned to their gathering position, and the relatively small quantity of clover which has accumulated in front of the cut-off during the dumping passes rearward in the manner already described and forms an effective nucleus, which materially facilitates the formation of the next bunch.

I do not wish to be understood as limiting myself to the precise details of construction hereinbefore described, and shown in the drawings, as they may obviously be modified without departing from the principle of my invention.

I am aware that heretofore it has been proposed to construct a harvester-dropper having a two-part platform raised some distance from the ground and constructed of continuous plates hinged together, so that when a sufficiency of grain has accumulated thereon the plates may be tilted to dump the gavel. My invention, however, is distinguished therefrom by the fact that I employ rods or fingers which trail upon the ground in such a way that there is a continuous carrying back of the cut clover as fast as it is cut, while the upturned ends of the fingers serve to retain the clover thus carried back and aid in forming the bunch.

Having thus fully described my invention, what I claim as new, and desire to secure by Letters Patent, is—

1. A clover-buncher comprising a cross-bar adapted for pivotal connection with the finger-bar of a mower or reaper, fingers extending rearward from said cross-bar, other fingers or tines pivotally connected with the first-mentioned fingers, extending rearward and upward therefrom and otherwise unsupported whereby they are adapted to rest or trail upon the ground, and means for tilting said cross-bar and fingers to simultaneously form a cut-off and dump the bunch, substantially as described.

2. A clover-buncher comprising a cross-bar adapted for pivotal connection with the finger-bar of a mower or reaper, fingers extending rearward from said cross-bar, other fingers or tines pivotally connected with said first-mentioned fingers, extending rearward and upward therefrom and adapted to rest upon the ground, guide-fingers extending rearward and inward from the cross-bar, and means for tilting said cross-bar and fingers to simultaneously form a cut-off and dump the bunch, substantially as described.

3. The combination, with a mower or reaper, of a cross-bar pivotally connected with the rear edge of the finger-bar thereof, fingers extending rearward from said cross-bar, other fingers or tines pivotally connected with said first-mentioned fingers, extending rearward and upward therefrom and otherwise unsupported whereby they are adapted to rest or trail upon the ground, and an operating-lever mounted on the frame of the machine and operatively connected with said cross-bar to tilt the same, substantially as described.

4. In a clover-buncher, the combination, with a cross-bar adapted for pivotal connection with the finger-bar of a mower or reaper, of fingers extending rearward from said cross-bar, other fingers or tines pivotally connected with said first-mentioned fingers, extending rearward and upward therefrom and adapted to rest upon the ground, and auxiliary fingers extending rearward from the cross-bar in the spaces between said first-mentioned fingers, substantially as described.

5. In a clover-buncher, the combination, with a cross-bar adapted for pivotal connection with the finger-bar of a mower or reaper, of fingers extending rearward from said cross-bar, and other fingers or tines formed in pairs and pivotally connected by their connecting or cross pieces to the first-mentioned fingers, whereby the strain is equally distributed at the two ends of said cross-pieces, substantially as described.

6. In a clover-buncher, the combination, with a cross-bar adapted for pivotal connection with the finger-bar of a mower or reaper, of fingers projecting rearward from said cross-bar and provided with terminal clips, and other fingers or tines formed in pairs and having their connecting or cross pieces pivotally embraced by said clips, whereby the strain is equally distributed at the two ends of said cross-pieces, substantially as described.

In testimony whereof I affix my signature in presence of two witnesses.

AMOS SMITH.

Witnesses:
M. H. DYNES,
JOHN McCOY.